US011431759B2

(12) United States Patent
Park et al.

(10) Patent No.: US 11,431,759 B2
(45) Date of Patent: Aug. 30, 2022

(54) ELECTRONIC DEVICE PROVIDING IP MULTIMEDIA SUBSYSTEM (IMS) SERVICE IN NETWORK ENVIRONMENT SUPPORTING MOBILE EDGE COMPUTING (MEC)

(71) Applicant: Samsung Electronics Co., Ltd., Suwon-si (KR)

(72) Inventors: Kumrye Park, Suwon-si (KR); Changjong Kim, Suwon-si (KR); Minjung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 16/699,370

(22) Filed: Nov. 29, 2019

(65) Prior Publication Data

US 2020/0220905 A1 Jul. 9, 2020

(30) Foreign Application Priority Data

Jan. 3, 2019 (KR) .......................... 10-2019-0000711

(51) Int. Cl.
*H04L 65/1016* (2022.01)
*H04L 65/10* (2022.01)
(Continued)

(52) U.S. Cl.
CPC ...... *H04L 65/1016* (2013.01); *H04L 65/1006* (2013.01); *H04L 65/1069* (2013.01); *H04L 65/1073* (2013.01); *H04W 36/0022* (2013.01)

(58) Field of Classification Search
CPC ............ H04L 65/1006; H04L 65/1016; H04L 65/1026; H04L 65/1063; H04L 65/1066;
(Continued)

(56) References Cited

U.S. PATENT DOCUMENTS 10,110,495 B1 * 10/2018 Sabella .................. H04W 4/24
2008/0301747 A1 12/2008 Yan et al.
(Continued)

FOREIGN PATENT DOCUMENTS

| EP | 1 986 393 A1 | 10/2008 |
| KR | 10-1311588 B1 | 9/2013 |
| WO | 2017/176329 A1 | 10/2017 |

OTHER PUBLICATIONS

Mobile Edge Computing (MEC); Framework and Reference Architecture, ETSI GS MEC 003 V1.1.1, Mar. 2016 sections 6, 7.1.4.1, A.1; and figure 6-1, Mar. 2016.
(Continued)

*Primary Examiner* — Khaled M Kassim
*Assistant Examiner* — Kai Chang
(74) *Attorney, Agent, or Firm* — Jefferson IP Law, LLP

(57) ABSTRACT

An electronic device is provided. The electronic device includes a processor and a memory operatively connected to the processor. The memory stores instructions that, when executed, cause the processor to determine that IP multimedia subsystem (IMS) data to be transmitted and received between a first user equipment and a second user equipment can be processed by the same mobile edge computing (MEC) host based on location information received from the first user equipment and the second user equipment, instruct the MEC host to activate an IMS processing function, and transmit an address of the activated IMS processing function of the MEC host to the first user equipment and the second user equipment. Other embodiments are possible.

18 Claims, 11 Drawing Sheets

(51) Int. Cl.
*H04L 65/1069* (2022.01)
*H04L 65/1073* (2022.01)
*H04W 36/00* (2009.01)

(58) Field of Classification Search
CPC ............. H04L 65/1069; H04L 65/1073; H04L 65/1083; H04L 65/80; H04L 69/24; H04W 36/0022; H04W 4/02; H04W 4/16; H04W 8/08; H04W 80/10; H04W 88/182
See application file for complete search history.

(56) References Cited

U.S. PATENT DOCUMENTS

| | | | |
|---|---|---|---|
| 2010/0039987 A1 | 2/2010 | Hegde et al. | |
| 2013/0337766 A1 | 12/2013 | Bakker et al. | |
| 2016/0373360 A1* | 12/2016 | Frydman | H04L 47/22 |
| 2017/0041752 A1* | 2/2017 | Baek | H04W 4/023 |
| 2018/0041879 A1 | 2/2018 | Hooker et al. | |
| 2018/0054721 A1 | 2/2018 | Choe et al. | |
| 2018/0183855 A1* | 6/2018 | Sabella | H04L 47/803 |
| 2018/0199398 A1* | 7/2018 | Dao | H04L 41/5041 |
| 2018/0249317 A1* | 8/2018 | Kurasugi | H04W 76/10 |
| 2019/0140933 A1* | 5/2019 | Guim Bernat | H04L 43/08 |
| 2019/0268812 A1* | 8/2019 | Li | H04W 36/0033 |
| 2019/0335414 A1* | 10/2019 | Rasanen | H04W 64/00 |
| 2019/0380025 A1* | 12/2019 | Pentakota | H04W 12/80 |
| 2020/0154459 A1* | 5/2020 | Mukherjee | H04L 63/0892 |
| 2020/0169857 A1* | 5/2020 | Yang | H04L 43/0858 |
| 2020/0196203 A1* | 6/2020 | Yang | H04W 36/10 |
| 2020/0267518 A1* | 8/2020 | Sabella | H04W 12/06 |
| 2020/0351637 A1* | 11/2020 | Wang | H04W 8/18 |

OTHER PUBLICATIONS

CMCC, 'Discussion on RAN support of edge computing in NR', R2-1808566, 3GPP TSG-RAN WG2 Meeting #102, Busan, Korea, May 11, 2018 sections 2.1-3; and figures 3-4, May 11, 2018.
Extended European Search Report dated Apr. 28, 2020, issued in European Application No. 20150063.4.
International Search Report dated Mar. 6, 2020, issued in International Application No. PCT/KR2019/016506.

* cited by examiner

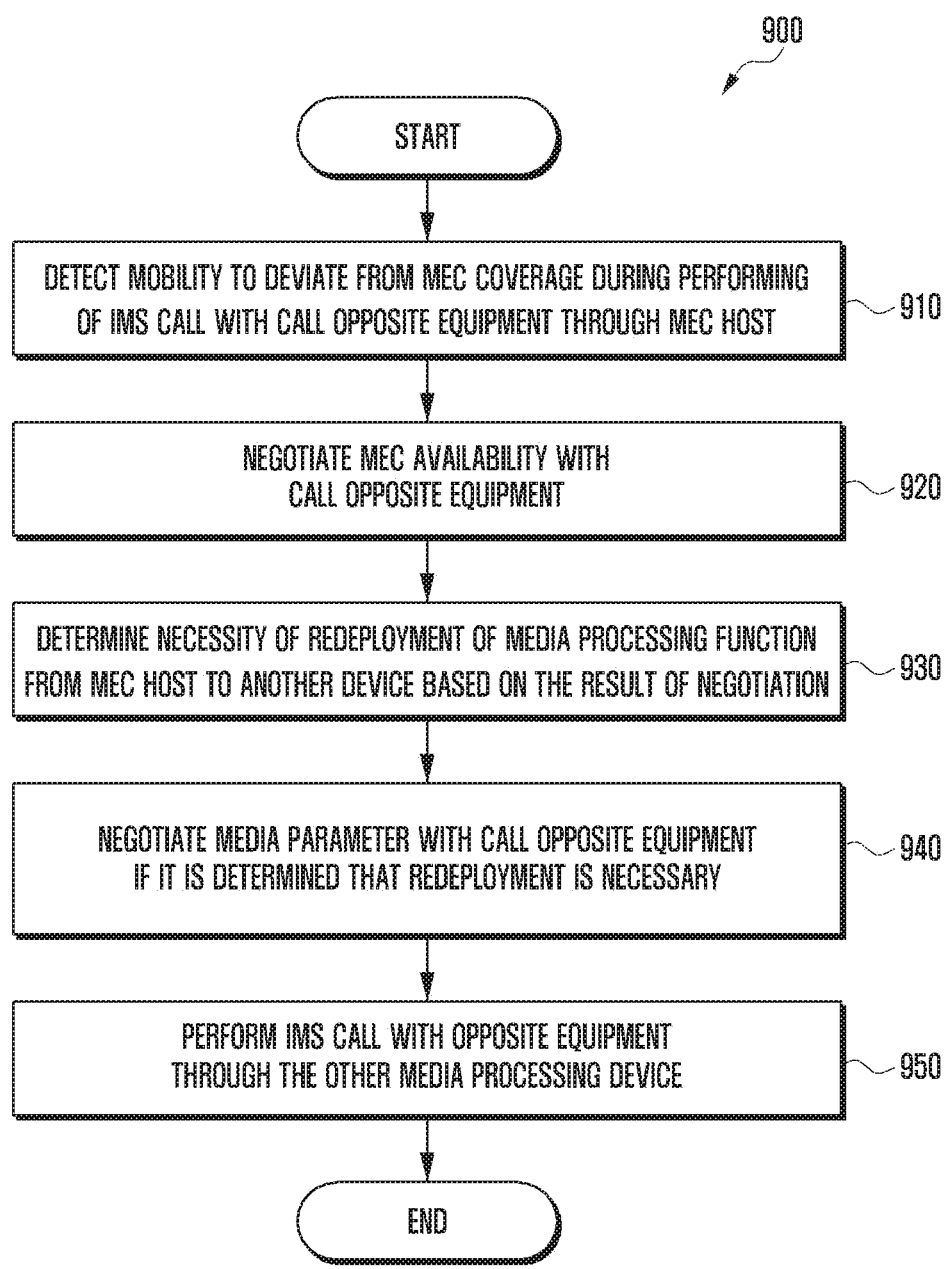

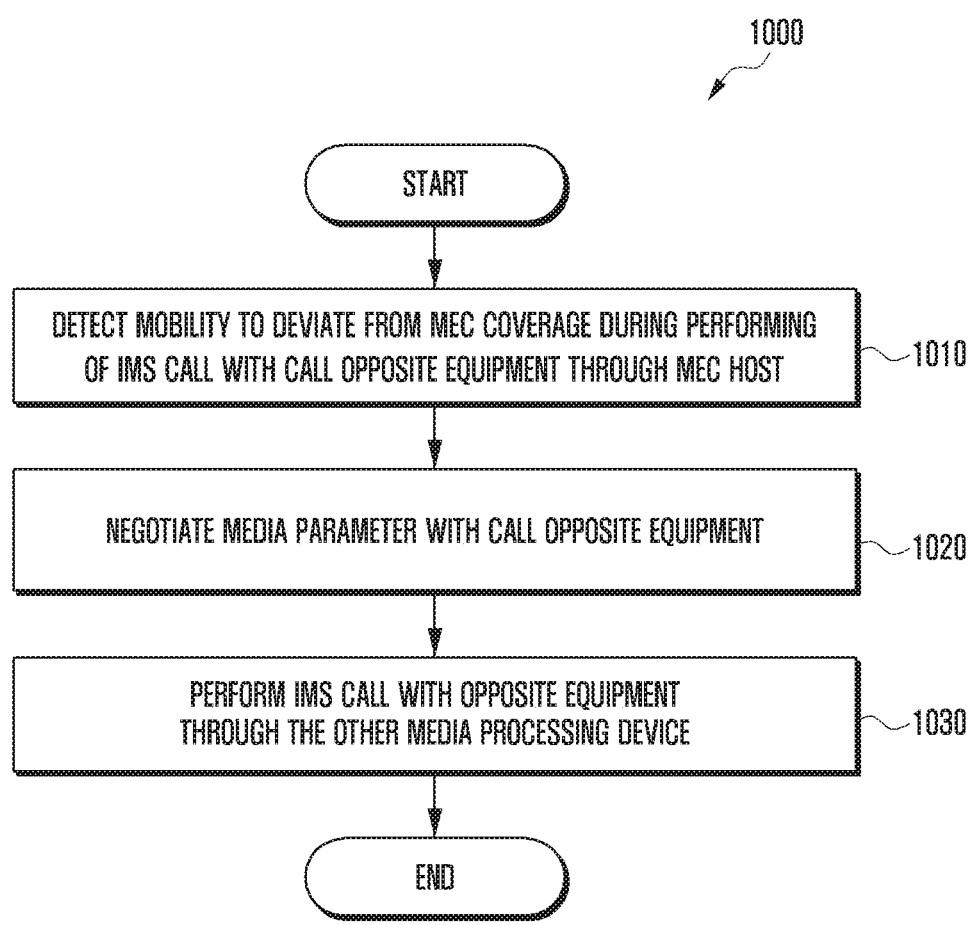

ELECTRONIC DEVICE PROVIDING IP MULTIMEDIA SUBSYSTEM (IMS) SERVICE IN NETWORK ENVIRONMENT SUPPORTING MOBILE EDGE COMPUTING (MEC)

CROSS-REFERENCE TO RELATED APPLICATION(S)

This application is based on and claims priority under 35 U.S.C. 119(a) of a Korean patent application number 10-2019-0000711, filed on Jan. 3, 2019, in the Korean Intellectual Property Office, the disclosure of which is incorporated by reference herein in its entirety.

BACKGROUND

1. Field

The disclosure relates to an electronic device configured to transmit, receive, and process IP multimedia subsystem (IMS) data.

2. Description of Related Art

IMS may provide multimedia services, such as voice, audio, video, and data, based on an Internet protocol (IP). The mobile edge computing (MEC) may mean a technology whereby a server located in a place (e.g., base station) that is close to user equipment processes data (e.g., IMS data) being transmitted and received between user equipment.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with another aspect of the disclosure, a method for a network is provided. The network includes a radio access network (RAN) to which user equipment is connected through a radio communication channel and a core network that performs a server function of managing subscriber information of the user equipment and providing an additional service. An SIP server and a media server for supporting an IMS service may be located in the core network, and thus an IMS service delay of a specific level may occur due to a physical distance between the user equipment and the servers. Such a delay may cause a sound delay or distortion and a video blocking phenomenon, and thus a required quality of IMS service (e.g., quality of service (QoS) or quality of experience (QoE)) may not be secured.

In accordance with another aspect of the disclosure, an electronic device configured to reduce delay elements by making an MEC host located in a place adjacent to user equipment rather than a core network perform an IMS processing function, and to reduce network costs for media processing in the core network is provided.

In accordance with another aspect of the disclosure, an electronic device configured to continuously provide an IMS service to user equipment even if the user equipment deviates from a MEC coverage supported by a MEC host is provided.

In accordance with another aspect of the disclosure, an electronic device is provided. The electronic device includes a processor, and a memory operatively connected to the processor, wherein the memory, stores instructions that, when executed, cause the processor to determine that IMS data to be transmitted and received between a first user equipment and a second user equipment can be processed by a same mobile edge computing (MEC) host based on location information received from the first user equipment and the second user equipment, instruct the MEC host to activate an IMS processing function, and transmit an address of the activated IMS processing function of the MEC host to the first user equipment and the second user equipment.

In accordance with another aspect of the disclosure, an electronic device is provided. The electronic device includes a processor, and a memory operatively connected to the processor, wherein the memory stores instructions that, when executed, cause the processor to transmit a request message for transmitting and receiving IP multimedia subsystem (IMS) media data with another electronic device to an IMS server together with location information of the electronic device, receive an address of an activated IMS processing function of a mobile edge computing (MEC) host from the IMS server in response to the transmission of the location information, and transmit IMS data to the other electronic device through the MEC host.

In accordance with another aspect of the disclosure, an electronic device is provided. The electronic device includes a processor, and a memory operatively connected to the processor, wherein the memory stores instructions that, when executed, cause the processor to receive a request message for transmitting and receiving IP multimedia subsystem (IMS) media data with another electronic device from an IMS server together with location information of the electronic device, transmit a response message including the location information of the electronic device to the IMS server in response to the reception of the request message including location information of the other electronic device, receive an address of an activated IMS processing function of a mobile edge computing (MEC) host from the IMS server in response to the transmission of the location information of the electronic device to the IMS server, and transmit IMS data to the other electronic device through the MEC host.

According to the various embodiments of the disclosure, because the electronic device makes the MEC host located in the place adjacent to the user equipment rather than the core network perform the IMS processing, the quality of the IMS service can be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which:

FIG. 9 is a diagram illustrating operations of implementing continuity of an IMS call in user equipment according to an embodiment of the disclosure; and FIG. 10 is a diagram illustrating operations of implementing continuity of an IMS call in user equipment according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
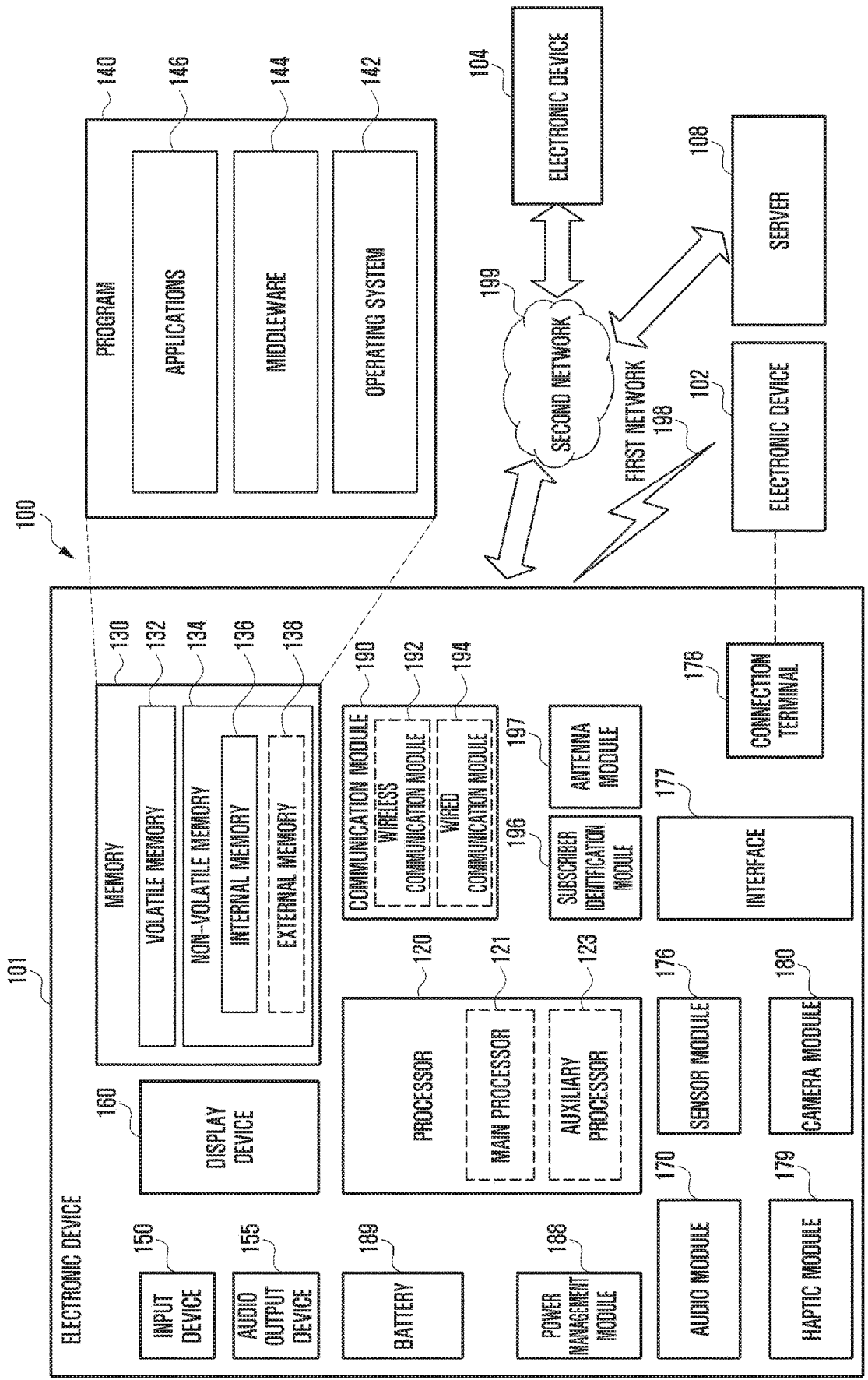
FIG. 1 is a diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
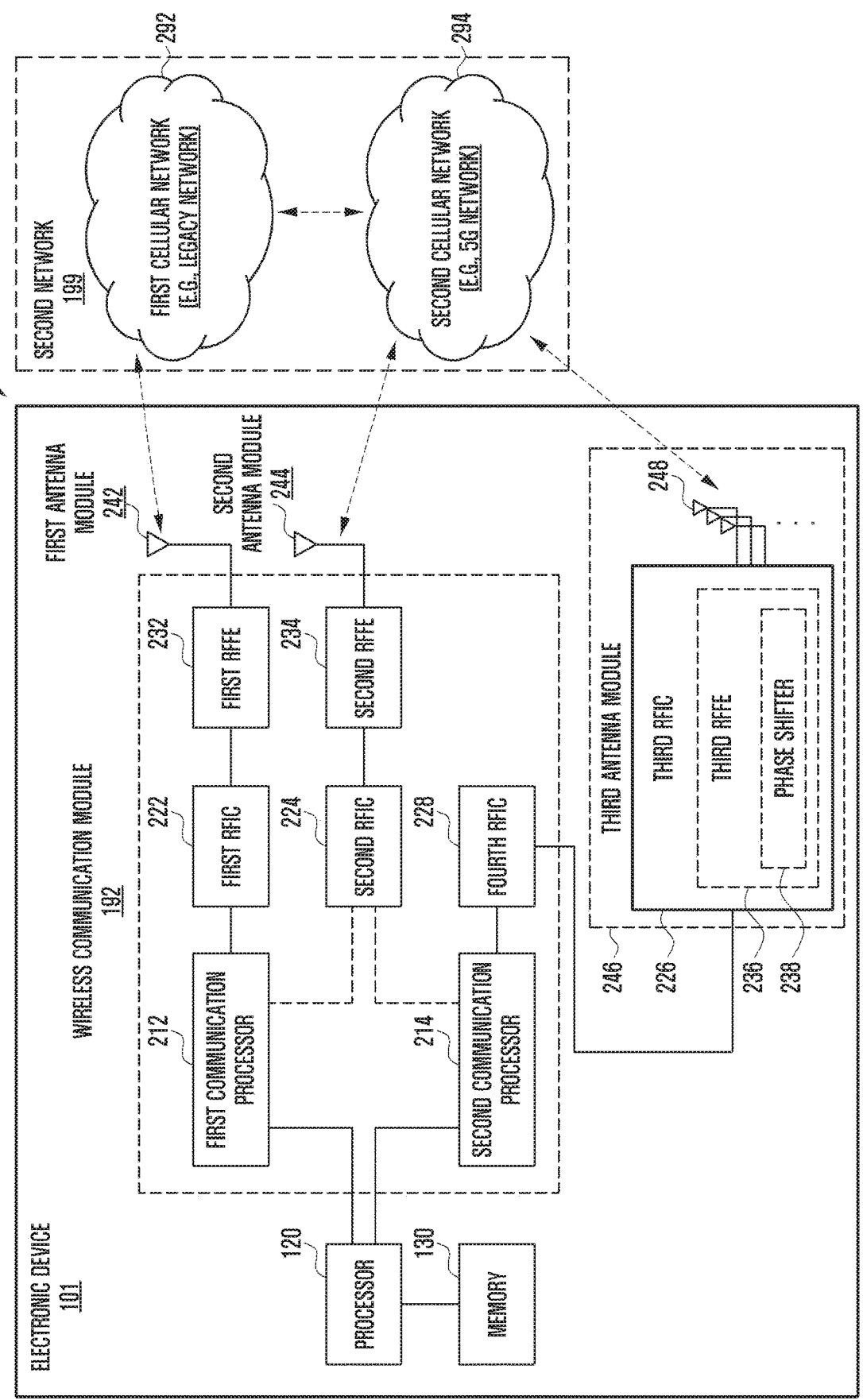
FIG. 2 is a block diagram of an electronic device for supporting legacy network communication and 5G network communication according to an embodiment of the disclosure.

FIG. 2 is a block diagram of an electronic device for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130.

The network 199 may include a first network 292 and a second network 294. The electronic device 101 may further include at least one component among the components illustrated in FIG. 1, and the network 199 may further include at least one different network. The first communication processor 212, the second communication processor 214, the first RFIC 222, the second RFIC 224, the fourth RFIC 228, the first RFFE 232, and the second RFFE 234 may form at least a part of the wireless communication module 192. The fourth RFIC 228 may be omitted or included as a part of the third RFIC 226.

The first communication processor 212 may support establishment of a communication channel in a band to be used for wireless communication with the first network 292, and legacy network communication through the established communication channel. The first network may be a legacy network including a 2G, 3G, 4G, or long term evolution (LTE) network. The second communication processor 214 may support establishment of a communication channel corresponding to a designated band (e.g., about 6 GHz to about 60 GHz) among bands to be used for wireless communication with the second network 294, and 5G network communication through the established communication channel. The second network 294 may be a 5G network defined by third generation partnership project (3GPP). Additionally, the first communication processor 212 or the second communication processor 214 may support establishment of a communication channel corresponding to another designated band (e.g., about 6 GHz or lower) among the bands to be used for wireless communication with the second network 294, and 5G network communication through the established communication channel. The first communication processor 212 and the second communication processor 214 may be implemented inside a single chip or a single package. The first communication processor 212 or the second communication processor 214 may be formed inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which is used for the first network 292 (e.g., legacy network), during transmission. During reception, an RF signal may be acquired from the first network 292 (e.g., legacy network) through an antenna (e.g., the first antenna module 242), and may be preprocessed through an RFFE (e.g., the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (e.g., about 6 GHz or lower) (hereinafter, referred to as a 5G Sub6 RF signal) that is used for the second network 294 (e.g., 5G network). During reception, a 5G Sub6 RF signal may be acquired from the second network 294 (e.g., 5G network) through an antenna (e.g., the second antenna module 244), and may be preprocessed through an RFFE (e.g., the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (e.g., about 6 GHz to about 60 GHz) (hereinafter, referred to as a 5G Above6 signal) that is to be used for the second network 294. During reception, a 5G Above6 RF signal may be acquired from the second network 294 through an antenna (e.g., the antenna 248), and may be preprocessed through the third RFFE 236. The third RFIC 226 may convert the preprocessed 5G Above6 signal into a baseband signal such that the same can be processed by the second communication processor 214. The third RFFE 236 may be formed as a part of the third RFIC 226.

The electronic device 101 may include a fourth RFIC 228 separately from the third RFIC 226 or as at least a part thereof. In this case, the fourth RFIC 228 may convert a baseband signal generated by the second communication processor 214 into an RF signal in an intermediate frequency band (e.g., about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 through an antenna and converted into an IF signal by the third RFIC 226. The fourth RFIC 228 may convert the IF signal into a baseband signal such that the same can be processed by the second communication processor 214.

The first RIFC 222 and the second RFIC 224 may be implemented as at least a part of a single chip or a single package. The first RFFE 232 and the second RFFE 234 may be implemented as at least a part of a single chip or a single package. At least one antenna module of the first antenna module 242 or the second antenna module 244 may be omitted or coupled to another antenna module so as to process RF signal in multiple corresponding bands.

The third RFIC 226 and the antenna 248 may be arranged on the same substrate so as to form a third antenna module 246. For example, the wireless communication module 192 or the processor 120 may be arranged on a first substrate (e.g., main PCB). In this case, the third RFIC 226 may be formed on a partial area (e.g., lower surface) of a second substrate (e.g., sub PCB) that is separate from the first substrate, and the antenna 248 may be arranged in another partial area (e.g., upper surface), thereby forming a third antenna module 246. The third RFIC 226 and the antenna 248 may be arranged on the same substrate such that the length of the transmission line between the same can be reduced. This may reduce loss (e.g., attenuation) of a signal in a high-frequency band (e.g., about 6 GHz to about 60 GHz) used for 5G network communication, for example, due to the transmission line. Accordingly, the electronic device 101 may improve the quality or speed of communication with the second network 294.

The antenna 248 may be formed as an antenna array including multiple antenna elements that may be used for beamforming. In this case, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (e.g., base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 may be operated independently of the first network 292 (e.g., standalone (SA)), or operated while being connected thereto (e.g., non-standalone (NSA)). For example, the 5G network may include only an access network (e.g., 5G radio access network (RAN) or next-generation network (NG RAN)) and include no core network (e.g., next-generation core (NGC)). In this case, the electronic device 101 may access the access network of the 5G network and then access an external network (e.g., Internet) under the control of the core network (e.g., evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute the instructions, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 3:
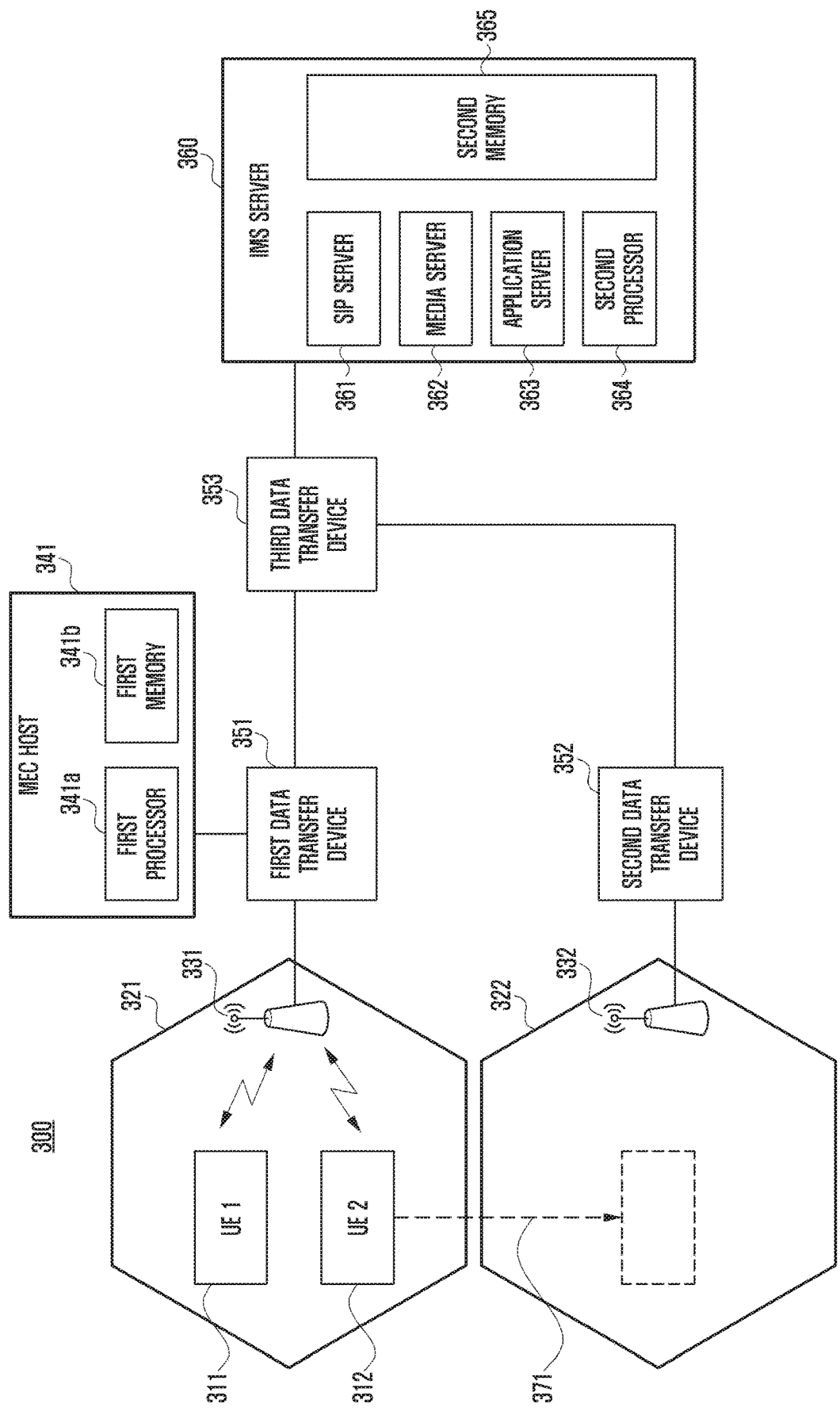
FIG. 3 is a diagram illustrating an IP multimedia subsystem (IMS) network according to an embodiment of the disclosure.

FIG. 3 is a diagram illustrating an IP multimedia subsystem (IMS) network according to an embodiment of the disclosure.

Referring to FIG. 3, an IMS network 300 may include user equipment (UE) 311 and 312, base stations 331 and 332 respectively related to cells 321 and 322, a mobile edge computing (MEC) host 341, data transfer devices 351, 352, and 353, and an IMS server 360.

If two UEs (e.g., first UE 311 and second UE 312) performing IMS communication (e.g., voice call, video call, or file transmission) are located in the same mobile edge computing (MEC) coverage (e.g., first cell 321), operations of deploying (e.g., offloading) a media processing function (e.g., multimedia resource function (MRF)) among functions of the IMS server 360 in a MEC host (e.g., MEC host 341) that takes charge of processing of media transmitted and received between the UEs located within the corresponding coverage may be performed in the IMS network 300. The MEC coverage is an area of which the corresponding MEC host takes charge for IMS communication, and may include, for example, at least one cell. Accordingly, a call delay element that occurs due to a physical distance between the UE and the IMS server 360 can be reduced. Further, because the media processing is performed by the MEC host rather than the IMS server 360 of a service provider, network costs for processing (e.g., relaying, transcoding, mixing, and the like) media packets can be reduced.

The first UE 311 (e.g., electronic device 101 of FIG. 1) may be connected to a first base station 331 related to the first cell 321 (e.g., base station of a first network 292 or a second network 294 of FIG. 2) through a radio communication channel. The first UE 311 may transmit a request message for the IMS communication to the second UE 312 through the first base station 331. If the second UE 312 (e.g., electronic device 104 of FIG. 1) is located in the same coverage (e.g., first cell 321) as that of the first UE 311, establishment of a session for the IMS communication between the first UE 311 and the second UE 312 may be performed by the IMS server, and an IMS call between the session-established first and second UEs 311 and 312 may be performed by the MEC host that takes charge of the corresponding MEC coverage.

During the IMS communication through the MEC host 341, the first UE 311 and the second UE 312 may display first state information indicating that communication through the MEC host is being performed. During the IMS communication through the MIS server 360, the first UE 311 and the second UE 312 may not display the first state information, or they may display second state information that is different from the first state information and means that the IMS communication is being performed through the IMS server 360.

If deviating from the MEC coverage during the IMS communication through the MEC host, the first UE 311 and the second UE 312 may ask a user whether to perform the IMS communication continuously through a display of a message (e.g., popup window), or the first UE 311 and the second UE 312 may process the same through a predetermined user's set value. In response to a user input of the set values or the message, the first UE 311 and the second UE 312 may terminate the IMS communication, or they may perform a procedure for maintaining the IMS communication (e.g., media parameter (e.g., media server address or codec information) negotiation for reestablishment of a call session) with the IMS server 360.

In order to establish a session for communication with the second UE 312, the first UE 311 may include a cell ID and/or GPS information in a P-Access-Network-Info header of an SIP INVITE message transferred to the IMS server 360 (e.g., IMS call session control function (e.g., IMS CSCF). When transferring a response to the SIP INVITE message to the IMS server 360 (e.g., IMS CSCF), the second UE 312 may include a cell ID and/or GPS information in the response message. The IMS server 360 may determine whether the two UEs 311 and 312 are located in the same MEC coverage based on the cell ID and/or GPS information received from the two UEs 311 and 312.

The first UE 311 and the second UE 312 may identify MEC availability (e.g., MEC IMS application availability) by performing a MEC discovery procedure for searching for an adjacent (or connectable) MEC host, and the first US 311 and the second UE 312 may include the identified MEC availability information in the SIP INVITE message and the response message to be transferred to the IMS server 360. The MEC discovery procedure may be performed in accordance with a standard procedure (e.g., uniform resource identifier (URI) discovery procedure) defined in ETSI. Further, the MEC discovery procedure may follow a procedure defined by an IMS service provider and/or a MEC service provider.

The MEC host 341 may be composed of one or more servers. The IMS server 360 may activate a media processing function of a suitable one of MEC hosts (e.g., MEC host 341 taking charge of a MEC coverage in which two UEs 311 and 312 are located.

The MEC host 341 may be located adjacent to a network (e.g., base station (e.g., eNodeB, or radio network controller (RNC)) on the side close to the user equipment in a network (e.g., first network 292 and/or second network 294 of FIG. 2), and may support the IMS service (e.g., voice over LTE and/or video over LTE) defined in the $3^{rd}$ generation partnership project (3GPP) standards. The mobile edge computing (MEC) host 341 may process the IMS data that is transmitted and received between the UEs located in the same MEC coverage.

One MEC coverage may be composed of one cell. For example, the first data transfer device 351 may be a device including a localized user plane function (UPF) adjacent to an access network of the first network 292 of FIG. 2 or an access network of the second network 294. The first data transfer device 351 may be connected by wire to the first base station 331 related to the first cell 321 in a radio access network. The first data transfer device 351 may transfer data received from the first base station 331 to the IMS server 360 through the third data transfer device 353 (e.g., UPF device) and/or may transfer the data received from the IMS server 360 to the first base station 331 through the third data transfer device 353. The MEC host 341 may be connected by wire to the first data transfer device 351, and may include a first memory 341b operatively connected to the first processor 341a and configured to or adapted to store instructions to be executed by the first processor 341a. For example, the first memory 341b may read and process a specific traffic (e.g., IMS data packet) among raw data traffics transmitted from the UE to the first data transfer device 351 through the first base station 331, and may store instructions for transmitting the processed traffic to the other UE through the first base station 331.

The second data transfer device 352 may be located in the neighborhood of the second base station 332 related to the second cell 322 in the radio access network. The second data transfer device 352 may transfer data received from the second base station 332 to the IMS server 360 through the third data transfer device 353 and/or may transfer data received from the IMS server 360 to the second base station 332 through the third data transfer device 353.

According to another embodiment of the disclosure, one MEC coverage may be composed of two or more cells. For example, although not illustrated, a fourth data transfer device connected by wire to a third base station related to the third cell may be included in the radio access network. The MEC host 341 may be connected by wire to not only the first data transfer device 351 but also the fourth data transfer device to process media transmitted and received between the UEs in the same MEC coverage.

The IMS server 360 may be located inside a core network (e.g., core network of the first network 292 or core network of the second network 294 of FIG. 2)) or outside a core network (e.g., server 108 of FIG. 1), and may support the IMS service. The IMS server 360 may include an SIP server 361, a media server 362, an application server 363, a second processor 364, and/or a second memory 365. The SIP server 361 may perform signaling processes (e.g., IMS session start, change, and end between the UEs 311 and 312) by transmitting and receiving a session initiation protocol (SIP) message defined in 3GPP standards with the UEs 311 and 312. For example, the SIP server 361 may include a proxy call session control function (P-CSCF), interrogation CSCF (I-CSCF), and serving CSCF (S-CSCF). The application server 363 is a server supporting an application service for the UE, and it may include, for example, a telephony application server (TAS), an IP multimedia application server (IM-AS), or a messaging application server (MSG-AS). The media server 362 may process the media transmitted and received between two UEs (e.g., first UE 311 and second UE 312) of which the sessions are established by the SIP server 361. For example, the media server 362 may support a multimedia resource function processor (MRFP) including functions of mixing, generating, and processing the media, such as voice and video, and an MRF controller (MRFC) including an MRFP controlling function through transmission and reception of an SIP message with another server (e.g., SIP server 361) in the IMS server 360. The media server 362 may use, for example, a real time transport protocol (RTP) when transmitting the processed media to the UE. The second memory 365 may be operatively connected to the second processor 364, and it may store instructions to be executed by the second processor 364 and/or processed media. In a certain embodiment, the SIP server 361, the media server 362, and the application server 363 may be devices physically separated from the IMS server 360.

The second processor 364 may identify whether two UEs having requested the IMS service can use the same MEC host. For example, the second processor 364 may determine MEC availability through location information of the UE included in messages sent by the UEs (e.g., SIP message and/or session description protocol (SDP) message).

If the UEs can use the service of the same MEC host (e.g., if the UEs are located in the same MEC coverage and/or the same cell), the second processor 364 may provide the IMS service to the two UEs using the media processing function (e.g., MRF) of the MEC host. The second processor 364 may enable the first UE 311 and the second UE 312 to use the media processing function through the MEC host through activation of the media processing function of the MEC host (e.g., MEC host 341) through a MEC interface (e.g., activation of context of the first UE 311 and the second UE 312). The second processor 364 may transmit an address (e.g., URL, IP address, or PORT) of an activated media processing function of the MEC host to the first UE 311 and the second UE 312 in response to an SIP INVITE command (message). For example, the IMS server 360 may include an MRF address of the MEC host in the session description protocol (SDP) message defined in 3GPP standards to be transmitted to the first UE 311 and the second UE 312. If the UEs do not exist in the same MEC coverage, the IMS server 360 may process the media. For example, the IMS server 360 may transmit the URL (MRF address) of the media server 362 to the UEs in response to the SIP INVITE command (message).

If inter-cell movement 371 of the UE performing an IMS call through the same MEC host occurs (e.g., if the second UE 312 moves from the first cell 321 to the second cell 322), operations in which the media server 362 takes charge of the media processing function again may be performed in the IMS network 300, and due to this, continuity of the IMS call between the two UEs may be secured.

In accordance with the movement from the first cell 321 to the second cell 322, the second UE 312 may detect that the base station connected through the radio communication channel has been changed from the first base station 331 to the second base station 332, and the second UE 312 may transfer the corresponding information (e.g., cell ID of the second base station 332) to the IMS server 360 (e.g., SIP server 361). In response to the reception of the above-described information, the SIP server 361 may perform a procedure of re-identifying the MEC coverage through transmission and reception of the SIP message (e.g., SIP OPTION message) with the second UE 312 and/or a procedure of re-identifying the media parameter through transmission and reception of the SIP message (e.g., SIP re-INVITE message) with the second UE 312. Through the above-described procedure, the SIP server 361 may identify that the inter-cell movement 371 of the second UE 312 is an action of deviating from the MEC coverage of the MEC host 341. The second processor 364 may determine deployment of the media processing function based on the information of the second UE 312 received from the SIP server 361. For example, the second processor 364 may configure the media server 362 to perform the IMS call between the first UE 311 and the second UE 312 instead of the MEC host 341. The second processor 364 may control the MEC host 341 to inactivate the media processing function (e.g., to delete the context between the first UE 311 and the second UE 312).

The second processor 364 may transfer an address (e.g., IP/PORT) of the media server 362 to the first UE 311 and the second UE 312, and thus continuity of the IMS call between the two UEs can be secured.

Figure 4:
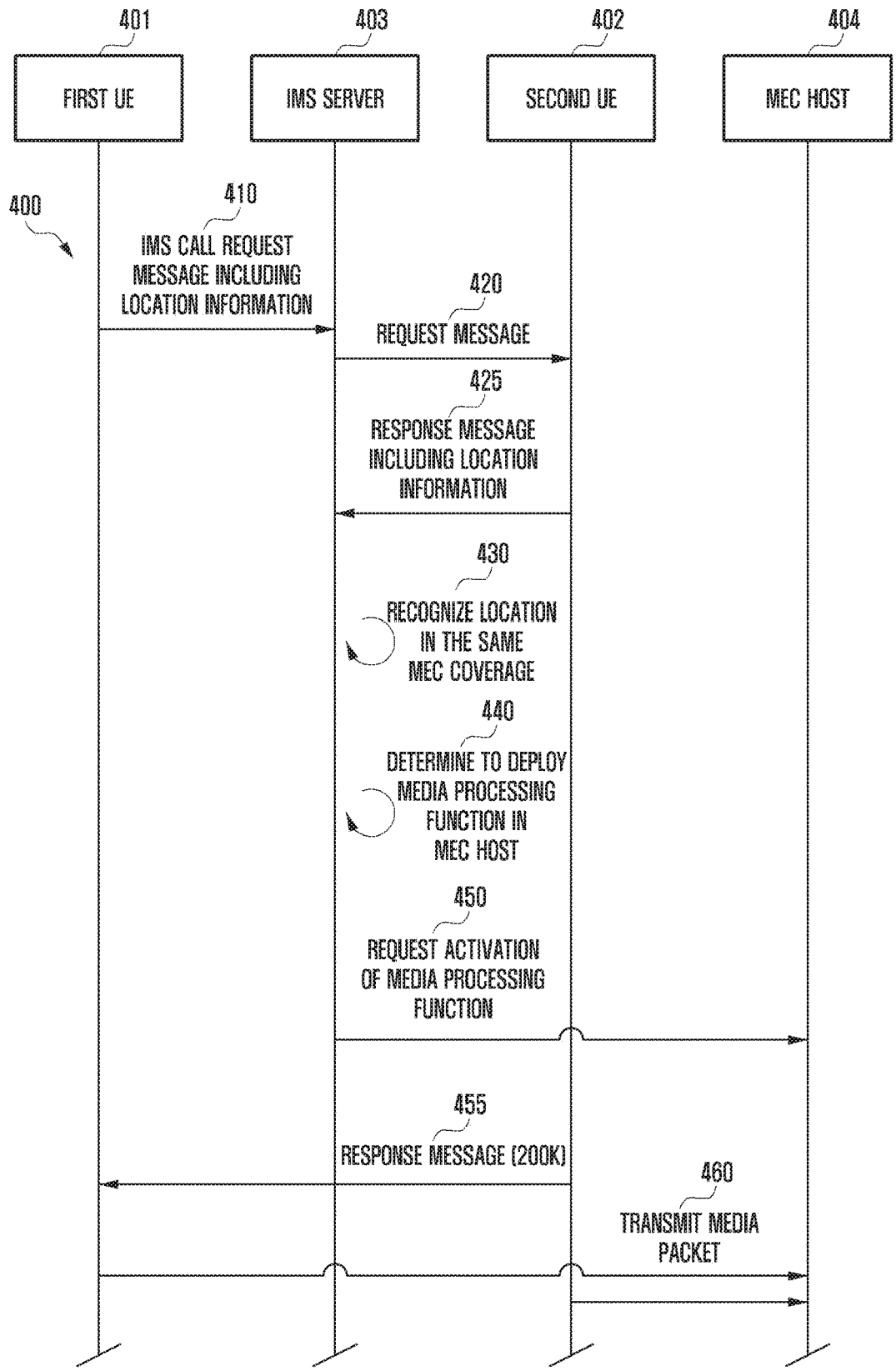
FIG. 4 is a diagram illustrating operations of implementing deployment of a media processing function in an IMS network according to an embodiment of the disclosure.

FIG. 4 is a diagram illustrating operations 400 of implementing deployment of a media processing function in an IMS network (e.g., IMS network of FIG. 3) according to an embodiment of the disclosure.

Referring to FIG. 4, at operation 410, a first UE 401 (e.g., first UE 311 of FIG. 3) may transmit a request message (e.g., SIP INVITE message) for IMS call with a second UE 402 (e.g., second UE 312 of FIG. 3) to an IMS server 403. The request message being transmitted to the IMS server 403 may include location information of the first UE 401. For example, as the location information, the request message may include at least one of a cell ID (e.g., ID of the first cell 321 of FIG. 3), GPS information, or MEC availability information (e.g., information (e.g., URL and/or IP address of the MEC host) acquired through performing of a MEC discovery procedure). The location information may be included in a private header (e.g., P-Access-Network-Info) of the SIP INVITE message to be transferred to the IMS server 403.

The first UE 401 may transfer the location information to the IMS server 403 and/or the second UE 402 through an SIP OPTION message defined in 3GPP standards in addition to the SIP INVITE message. For example, the SIP OPTION message including the location information may be transferred to the IMS server 403 and/or the second UE 402 separately from the SIP INVITE message (e.g., before the SIP INVITE message is transmitted).

At operation 420, the IMS server 403 (e.g., IMS server 360 of FIG. 3) may transfer the request message to the second UE 402.

At operation 425, the IMS server 403 may receive a response message to the request message from the second UE 402. The response message received from the second UE 402 may include location information of the second UE 402. For example, the response message may be a provisional response before a final response message (OK) is sent, and the response message may be a trying message, a ringing message, or a session progress message defined in the 3GPP standards. As the location information, the response message may include at least one of the cell ID (e.g., ID of the first cell 321 of FIG. 3), the GPS information, or the MEC availability information (e.g., information acquired through performing of the MEC discovery procedure).

At operation 430, the IMS server 403 (e.g., second processor 364 of FIG. 3) may recognize that that two UEs 401 and 402 are located in the same MEC coverage based on the location information received from the two UEs 401 and 402.

The IMS server 403 may receive a first cell ID and/or first GPS information from the first UE 401, and it may receive a second cell ID and/or second GPS information from the second UE 402. The IMS server may recognize that the cell corresponding to the first cell ID and the cell corresponding to the second cell ID constitute the same MEC coverage. For example, if the first cell ID and the second cell ID are the same, it may be recognized that the first UE 401 and the second UE 402 exist in the same MEC coverage. As another example, even if the first cell ID and the second cell ID are different from each other, the corresponding cells may be included in the same MEC coverage in all. The IMS server 403 may recognize that the first UE 401 and the second UE 402 exist in the same MEC coverage based on the first GPS information and the second GPS information. For example, the IMS server 403 may recognize that the location indicated by the first GPS information and the location indicated by the second GPS information belong to the same MEC coverage.

The first UE 401 and the second UE 402 may acquire MEC availability information (e.g., URL and/or IP address of the MEC host) by respectively performing the MEC discovery procedure, and it may transmit the acquired MEC availability information to the IMS server 403. The IMS server 403 may recognize that the first UE 401 and the second UE 402 exist in the same MEC coverage based on the availability information received from the first UE 401 and the second UE 402.

The IMS server 403 may identify the MEC availability of the first UE 401 and the second UE 402 through a procedure of inquiring of the MEC network, and may recognize that the first UE 401 and the second UE 402 exist in the same coverage based on the identified information.

At operation 440, the IMS server 403 may determine to deploy a media processing function in a MEC host 404. If it is recognized that the first UE 401 and the second UE 402 exist in the MEC coverage of the MEC host 404, it may be determined to deploy the media processing function in the MEC host 404. If it is recognized that the first UE 401 and the second UE 402 exist in the MEC coverage of the MEC host 404 and it is determined that the IMS server 403 and/or the core network are congested (e.g., if the number of created sessions exceeds a determined (or selected) threshold value or if the data throughput per unit time of the IMS server 403 exceeds a determined threshold value), it may be determined to deploy the media processing function in the MEC host 404.

In accordance with the determination of the deployment of the media processing function in the MEC host 404, at operation 450, the IMS server 403 may transmit a request for activation of the media processing function (e.g., activation of the context of the first UE 401 and the second UE 402) to the MEC host 404. The MEC host 404 may activate the media processing function for the first UE 401 and the second UE 402 in accordance with the request at operation 450. Further, the address of the activated media processing function of the MEC host 404 may be sent to the MEC host 404 as a reply. The IMS server 403 may transmit an SDP message to the first UE 401 and the second UE 402 in response to the SIP INVITE (or SIP OPTION) message. The IMS server 403 may include the address of the media processing function of the MEC host 404 in the provisional response message and/or the final response message to be transmitted to the first UE 401 and/or the second UE 402.

If the MEC host 404 sends a failure or reject message to the IMS server 403 in response to the request at operation 450, the IMS server 403 may determine to use the media processing function inside the IMS server, and may transmit the address of the media processing function inside the IMS server to the first UE 401 and/or the second UE 402.

At operation 455, the second UE 402 may transmit an OK message to the first UE 401 through the IMS server 403 as the final response to the IMS call request. After receiving the OK message, the first UE 401 may communicate with the second UE 402. The IMS server 403 may include the address of the media processing function determined to be used (e.g., address of the media processing function of the MEC host 404) in the final response message to be transmitted to the first UE 401.

At operation 460, the first UE 401 and the second UE 402 may transmit media packets to the address (e.g., address of the MEC host 404) received from the IMS server 403. The MEC host 404 (e.g., MEC host 341 of FIG. 3) may process the media packet received from the UE and may transfer the processed media packet to the opposite UE.

Figure 5:
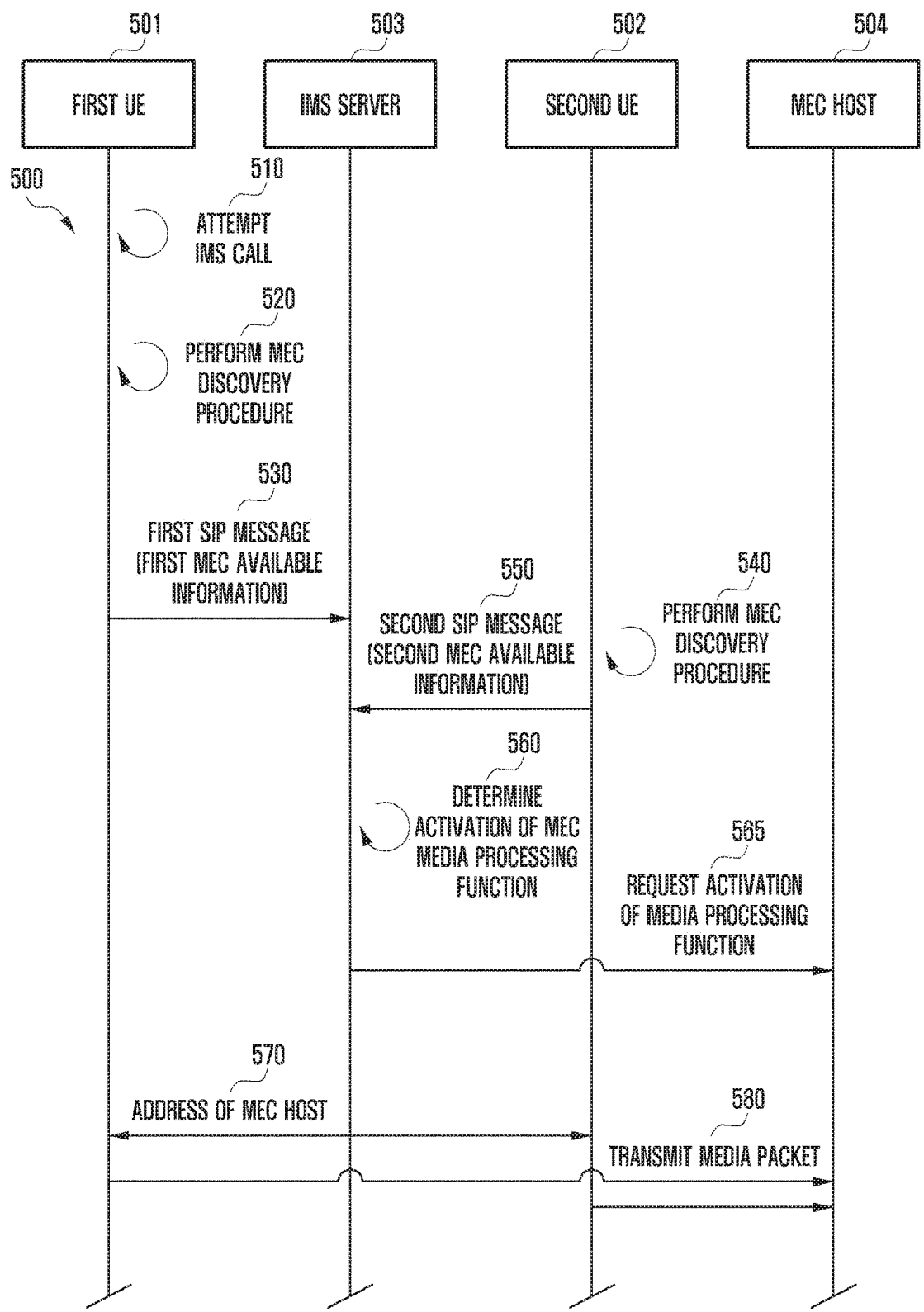
FIG. 5 is a diagram illustrating operations of implementing deployment of a media processing function in an IMS network according to an embodiment of the disclosure.

FIG. 5 is a diagram illustrating operations of implementing deployment of a media processing function in an IMS network (e.g., IMS network 300 of FIG. 3) according to an embodiment of the disclosure.

Referring to FIG. 5, at operation 510, a processor (e.g., processor 120 of FIG. 1) of a first UE 501 (e.g., first UE 311 of FIG. 3) may receive a user input for attempting an IMS call to a second UE 502 through an input device (e.g., input device 150 of FIG. 1).

At operation 520, the processor of the first UE 501 may identify that a MEC IMS application (e.g., IMS processing application) is usable in a place where the first UE 501 is located by performing a MEC discovery procedure for searching for a MEC host adjacent to the first UE 501 in a MEC network. Operation 520 may be performed before the user's IMS call attempt is made.

At operation 530, the processor of the first UE 501 may include first MEC available information acquired through performing of the MEC discovery procedure in a first SIP message (e.g., SIP INVITE message) to be transmitted to an IMS server 503. The IMS server 503 may transfer the first SIP message to the second UE 502.

At operation 540, the processor of the second UE 502 (e.g., second UE 312 of FIG. 3) may identify that the MEC IMS application (e.g., IMS processing application) is usable in a place where the second UE 502 is located by performing the MEC discovery procedure in response to the reception of the first MEC available information included in the SIP message.

At operation 550, the processor of the second UE 502 may include second MEC available information acquired through performing of the MEC discovery procedure in a second SIP message (e.g., provisional response message for the first SIP message) to be transmitted to the IMS server 503.

At operation 560, the processor (e.g., second processor 364 of FIG. 3) of the IMS server 503 (e.g., IMS server 360 of FIG. 3) may determine activation of a MEC media processing function (context activation between the first UE 501 and the second UE 502) based on the received first MEC available information and second MEC available information.

At operation 565, the processor of the IMS server 503 may transmit a request for activating the media processing function (e.g., for activating contexts of the first UE 501 and the second UE 502) to a MEC host 504 in accordance with the above-described determination.

At operation 570, the processor of the IMS server 503 may transfer an address of the MEC host 504 of which the media processing function is activated to the first UE 501 and the second UE 502. Address acquisition may become possible at operation 520 and/or operation 540, and thus operation 570 may be omitted. Instead, the processor of the IMS server 503 may transmit information indicating whether the activation has succeeded to the first UE 501 and the second UE 502.

At operation 580, the processor of the first UE 501 and the processor of the second UE 502 may transmit media packets to the address received from the IMS server 503 (e.g., address of the MEC host 504). The MEC host 504 (e.g., MEC host 341 of FIG. 3) may process the media packet received from the UE and it may transfer the processed media packet to the opposite UE.

Figure 6:
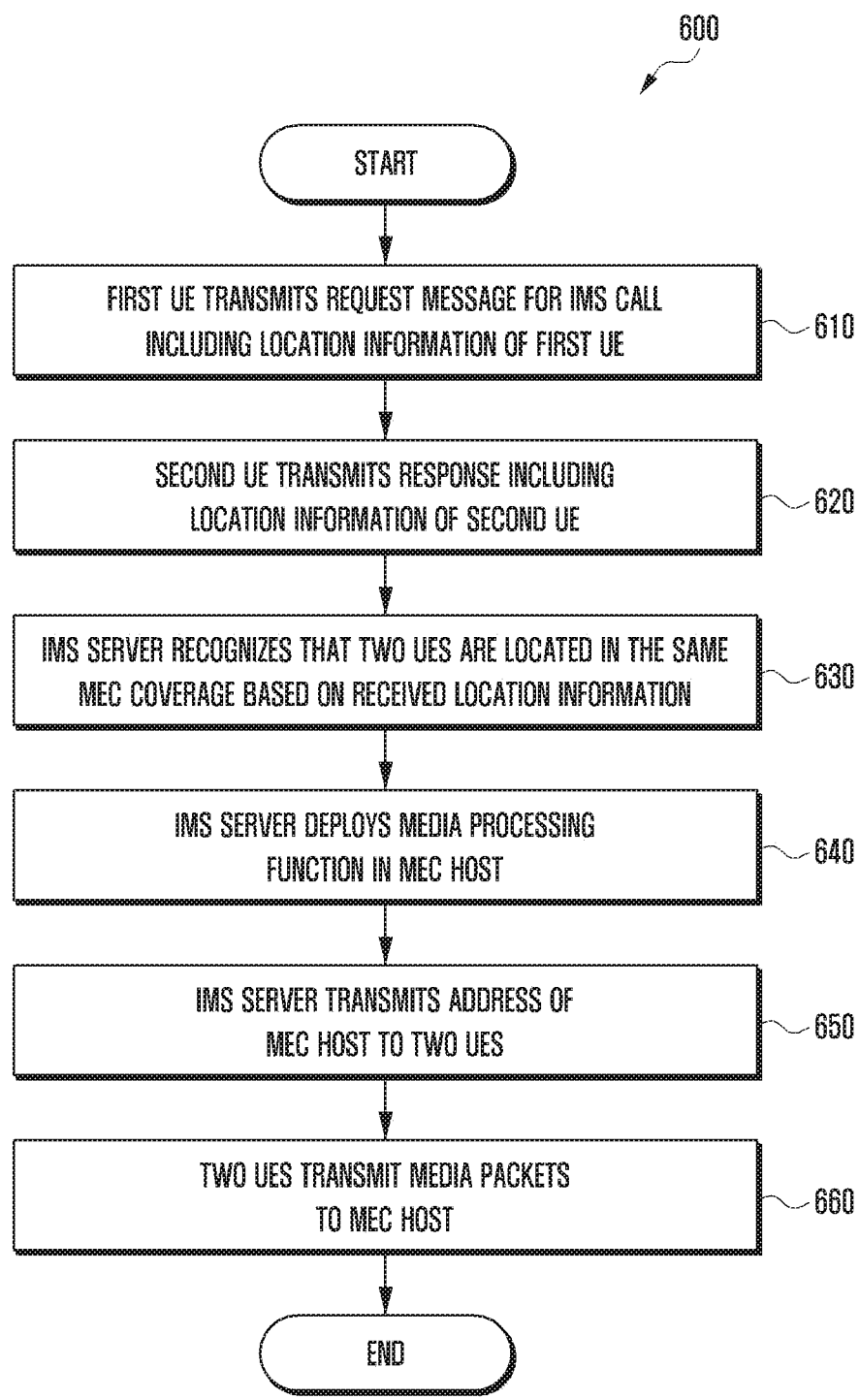
FIG. 6 is a diagram illustrating operations of implementing redeployment of a media processing function in an IMS network according to an embodiment of the disclosure.

FIG. 6 is a diagram illustrating operations 600 of implementing redeployment of a media processing function in an IMS network (e.g., IMS network 300 of FIG. 3) according to an embodiment of the disclosure.

Referring to FIG. 6, at operation 610, a processor (e.g., processor 120 of FIG. 1) of a first UE (e.g., first UE 311 of FIG. 3) may include location information (e.g., cell ID and/or GPS information) of the first UE in a request message (e.g., SIP INVITE message) for an IMS call with a second UE in response to a user input, and it may transmit the request message to an IMS server. The IMS server may transfer the received request message to the second UE 602.

At operation 620, a processor of the second UE (e.g., second UE 312 of FIG. 3) may include location information (e.g., cell ID and/or GPS information) of the second UE in a response message (e.g., provisional response) to be transmitted to the IMS server in response to the reception of the request message including the location information.

At operation 630, the processor (e.g., second processor 364 of FIG. 3) of the IMS server (e.g., IMS server 360 of FIG. 3) may recognize that the two UEs are located in the same MEC coverage based on the location information received from the two UEs. If the two UEs are not located in the same MEC coverage, the subsequent operations are not performed, and the media processing function of the IMS server may be used for the communication between the two UEs.

As the two UEs are located in the same MEC coverage, the processor of the IMS server, at operation 640, may deploy the media processing function in a MEC host supporting the media process in the corresponding coverage. For example, the deployment may include an operation of activating the media processing function of the MEC host and an operation of creating the context between the first UE 401 and the second UE 402.

At operation 650, the processor of the IMS server may transmit session configuration information for the IMS call including an address of a MEC IMS application (IMS processing application) to the two UEs in response to the reply (e.g., termination of the activation of the media processing function) from the MEC host 604 to the request.

At operation 660, the processor of the first UE 601 and the processor of the second UE 602 may transmit media packets to an address (e.g., address of the MEC host) received from the IMS server 603. The MEC host (e.g., MEC host 341 of FIG. 3) may process the media packet received from the UE and it may transfer the processed media packet to the opposite UE.

Figure 7:
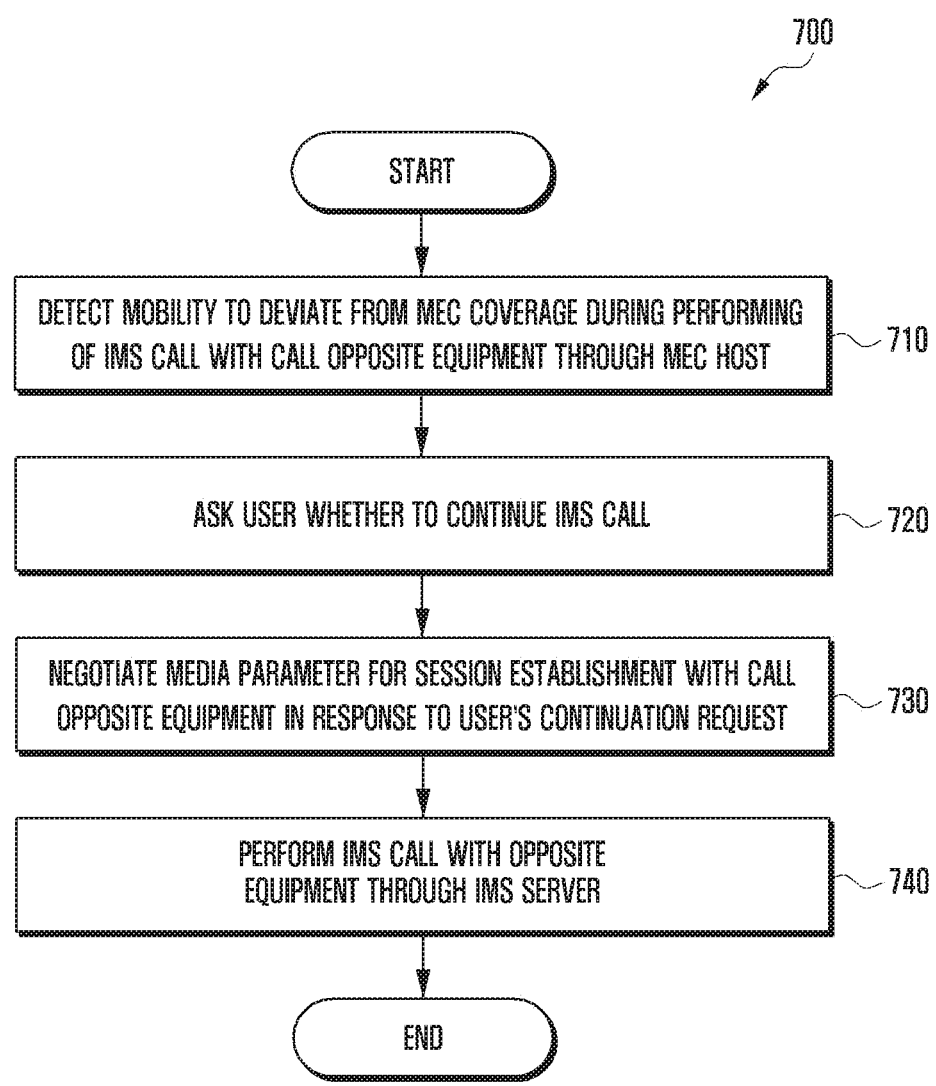
FIG. 7 is a diagram illustrating operations of implementing continuity of an IMS call in an IMS network according to an embodiment of the disclosure.

FIG. 7 is a diagram illustrating operations of implementing continuity of an IMS call in an IMS network (e.g., IMS network 300 of FIG. 3) according to an embodiment of the disclosure.

Figure 8A:
FIG. 8A is a diagram illustrating a call screen that can be displayed on user equipment according to an embodiment of the disclosure.
Figure 8B:
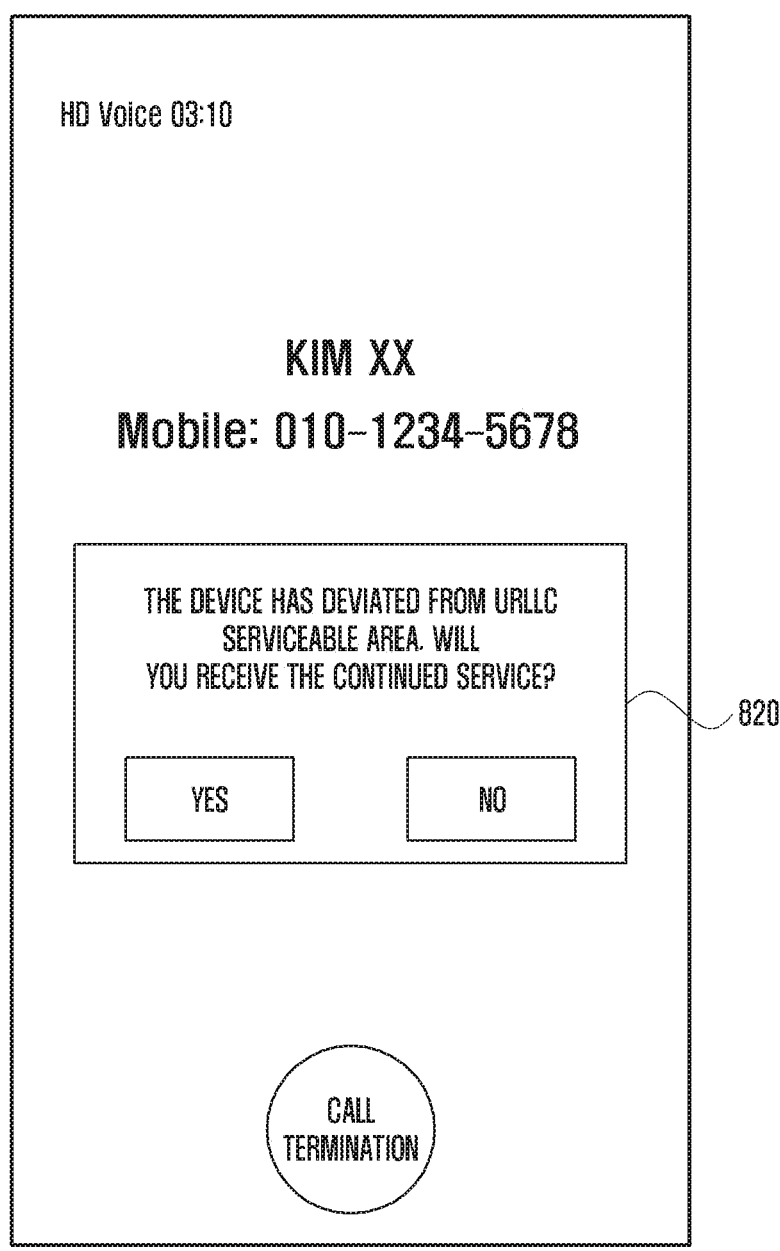
FIG. 8B is a diagram illustrating a call screen that can be displayed on user equipment according to an embodiment of the disclosure.

FIGS. 8A and 8B are diagrams illustrating call screens that can be displayed on user equipment according to various embodiments of the disclosure.

Referring to FIGS. 7, 8A, and 8B, the processor (e.g., processor 120 of FIG. 1) of the user equipment (e.g., second UE 312 of FIG. 3) may perform an IMS call with a call opposite equipment (e.g., first UE 311 of FIG. 3) through a MEC host. In this case, the processor of the user equipment may display information 811 indicating that the IMS call has been performed by the MEC host adjacent to the user equipment through a call screen 810 of FIG. 8A. At operation 710, the processor of the user equipment may detect mobility (inter-cell movement 371 of FIG. 3) of deviating from the MEC coverage during performing of the IMS call with the call opposite equipment through the MEC host. The processor of the user equipment may recognize the base station change as a secession from a MEC coverage (e.g., in the case where one cell configures one MEC coverage, movement from one cell to another cell). According to another embodiment of the disclosure, the processor of the user equipment may perform a MEC discovery procedure in response to the mobility detection, and it may recognize deviation from the existing MEC coverage based on information (e.g., MEC available information) acquired through the result of the performing. The processor of the user equipment may alternatively transmit the changed location information (e.g., cell ID and/or GPS information) to an IMS server (IMS server 360 of FIG. 3), and may receive, from the IMS server, a message indicating the deviation from the existing MEC coverage as a corresponding response of the IMS server.

If it is determined to deviate from the MEC coverage, the processor of the user equipment, at operation 720, may ask a user whether to continue the IMS call through, for example, a popup message 820 of FIG. 8B.

The processor of the user equipment may receive a service interrupt request from the user through the popup message 820, and accordingly, may terminate the IMS call. The processor of the user equipment may receive a service maintenance request from the user through the popup message 820, and thus the processor of the user equipment, at operation 730, may negotiate a media parameter (e.g., address of a media server or codec information for processing media data) by transmitting and receiving an SIP message (e.g., SIP re-INVITE message) with a call opposite equipment. After reestablishing a session with the opposite equipment through the negotiation, the processor of the user equipment, at operation 740, may perform the IMS call with the opposite equipment through the IMS server.

FIG. 9 is a diagram illustrating operations of implementing continuity of an IMS call in user equipment according to an embodiment of the disclosure.

Referring to FIG. 9, at operation 910, a processor (e.g., processor 120 of FIG. 1) of a user equipment (second UE 312 of FIG. 3) may detect mobility of the user equipment (e.g., mobility to deviate from a coverage of a MEC host and/or change of a cell being accessed (e.g., inter-cell movement 371 of FIG. 3)) during performing of an IMS call with another user equipment (e.g., first UE 311 of FIG. 3) through a MEC host (e.g., MEC host 341 of FIG. 3).

If the mobility of the user equipment is detected (e.g., if a change of a cell being accessed is detected or if it is determined to deviate from a MEC coverage), the processor of the user equipment, at operation 920, may negotiate MEC availability by transmitting and receiving an SIP message (e.g., SIP OPTION message) with a call opposite equipment. For example, the processor of the user equipment may include location information of the user equipment (e.g., cell ID, GPS information, and/or MEC availability information (e.g., URL and/or IP address of a MEC host) acquired through performing of a MEC discovery procedure) in a first SIP message to be transmitted to the call opposite device. In response to the first SIP message, the call opposite equipment may include location information of the call opposite equipment (e.g., cell ID, GPS information, and/or MEC availability information acquired through performing of a MEC discovery procedure) in a second SIP message to be transmitted to the user equipment.

At operation 930, the processor of the user equipment may determine the necessity of redeployment of a media processing function from the MEC host to another device (e.g., IMS server 360 of FIG. 3) as a device to perform media processing based on the result of the negotiation. For example, the result of the negotiation may include location information of the user equipment and/or location information of the call opposite equipment received from the call opposite equipment.

If it is determined that the redeployment of the media processing function is necessary, the processor of the user device, at operation 940, may negotiate a media parameter (e.g., address of a media server or codec information) by transmitting and receiving the SIP message (e.g., SIP re-INVITE message) with the call opposite equipment. According to an embodiment, if SIP messages (e.g., SIP re-INVITE messages that mean deviation from the MEC coverage) are received from the UEs at operation 940, the IMS server (e.g., SIP server 361) may perform the redeployment of the media processing function of the IMS, and it may transfer an address of a media server (e.g., media server 362 or media server of the MEC host 404) in accordance with the result of the redeployment to the UEs as parameters of the corresponding messages.

At operation 950, the processor of the user equipment may perform an IMS call with the opposite equipment through the address (of the corresponding media server) that is known through an SDP message during the session establishment after reestablishing the session with the opposite equipment through the negotiation.

FIG. 10 is a diagram illustrating operations of implementing continuity of an IMS call in user equipment according to an embodiment of the disclosure.

Referring to FIG. 10, at operation 1010, a processor (e.g., processor 120 of FIG. 1) of a user equipment (second UE 312 of FIG. 3) may detect mobility to deviate from a coverage of a MEC host (e.g., inter-cell movement 371 of FIG. 3 or change of a cell ID) during performing of an IMS call with another user equipment (e.g., first UE 311 of FIG. 3) through a MEC host (e.g., MEC host 341 of FIG. 3).

At operation 1020, the processor of the user equipment may negotiate a media parameter (e.g., address of a media server or codec information) by transmitting and receiving an SIP message (e.g., SIP re-INVITE message) with a call opposite equipment.

At operation 1030, the processor of the user equipment may perform an IMS call with the opposite equipment through another media processing device (e.g., media server 362 of the IMS server 360 of FIG. 3) that is known through an SDP message during the session establishment after reestablishing the session with the opposite equipment through the negotiation.

If SIP messages of the UEs are received, the IMS server (e.g., SIP server 361), at operations 1020 to 1030, may determine whether to deploy an IMS media processing function in the media server 362 or a MEC host 404, and may redeploy the function in a proper server.

According to various embodiments of the disclosure, an electronic device (e.g., IMS server 360 of FIG. 3) may include a processor; and a memory operatively connected to the processor. The memory stores instructions that, when executed, cause the processor to determine that IMS data to be transmitted and received between a first user equipment and a second user equipment can be processed by the same mobile edge computing (MEC) host (e.g., MEC host 341 of FIG. 3) based on location information received from the first user equipment (e.g., first UE 311 of FIG. 3) and the second user equipment (e.g., second UE 312 of FIG. 3), instruct the MEC host to activate an IMS processing function, and transmit an address of the activated IMS processing function of the MEC host to the first user equipment and the second user equipment.

According to various embodiments, the instructions may cause the processor to receive, from the first user equipment, a request message for transmitting and receiving IP multimedia subsystem (IMS) data with the second user equipment together with the location information of the first user equipment, and receive the location information of the second user equipment from the second user equipment in response to the request message.

According to various embodiments, the instructions may cause the processor to receive the location information through a session initiation protocol (SIP) message defined in 3GPP standards.

According to various embodiments, the location information may include at least one of a cell ID related to a cellular network base station, to which the corresponding user equipment is connected through a radio communication channel, GPS information, or MEC availability information acquired by the corresponding user equipment through performing of a MEC discovery procedure to search for the MEC host adjacent to the base station. The MEC availability information may include a URL and/or an IP address of the MEC host.

According to various embodiments, the IMS data may include audio data or video data.

According to various embodiments, the instructions may cause the processor to: receive a message that means deviation from a MEC coverage supported by the MEC host from the first user equipment or the second user equipment, and deploy the IMS processing function from the MEC host to an IMS server based on the reception of the message. The operation for the deployment may include commanding the MEC host to inactivate the IMS processing function; and transmitting an address of the IMS processing function of the IMS server to the first user equipment or the second user equipment.

According to various embodiments, the instructions may cause the processor to transmit the address of the activated IMS processing function of the MEC host to the first user equipment and the second user equipment through a session description protocol (SDP) message defined in 3GPP standards.

According to various embodiments of the disclosure, an electronic device (e.g., second UE 312 of FIG. 3) may include a processor and a memory operatively connected to the processor. The memory stores instructions that, when executed, cause the processor to transmit a request message for transmitting and receiving IP multimedia subsystem (IMS) media data with another electronic device (e.g., first UE 311 of FIG. 3) to an IMS server (e.g., IMS server 360 of FIG. 3) together with location information of the electronic device, receive an address of an activated IMS processing function of a mobile edge computing (MEC) host (e.g., MEC host 341 of FIG. 3) from the IMS server in response to the transmission of the location information, and transmit IMS data to the other electronic device through the MEC host.

According to various embodiments, the instructions may cause the processor to transmit the location information to the IMS server through a session initiation protocol (SIP) message defined in 3GPP standards.

According to various embodiments, the instructions may cause the processor to display information indicating that transmission and reception of IMS data are performed through the MEC host.

According to various embodiments, the instructions may cause the processor to detect mobility to deviate from a MEC coverage supported by the MEC host during transmission and reception of IMS data with the other electronic device through the MEC host, ask a user whether to continue an IMS service in response to the detection of the mobility, receive an address of an IMS processing function of the IMS server from the IMS server based on reception of a user input indicating the continuation of the IMS service, and transmit the IMS data to the other electronic device through the IMS server. The instructions may cause the processor to negotiate a media parameter with the other electronic device by transmitting and receiving an SIP message defined in 3GPP standards in response to the reception of the user input indicating the continuation of the IMS service, wherein the media parameter may include the address of the IMS processing function of the IMS server. The media parameter may further include codec information to process the IMS data to be transmitted and received with the other electronic device.

According to various embodiments, the instructions may cause the processor to receive the address of the activated IMS processing function of the MEC host from the IMS server through a session description protocol (SDP) message defined in 3GPP standards.

According to various embodiments, an electronic device (e.g., first UE 311 of FIG. 3) may include a processor and a memory operatively connected to the processor. The memory stores instructions that, when executed, cause the processor to: receive a request message for transmitting and receiving IP multimedia subsystem (IMS) media data with another electronic device (e.g., second UE 312 of FIG. 3) from an IMS server (e.g., IMS server 360 of FIG. 3) together with location information of the electronic device, transmit a response message including the location information of the electronic device to the IMS server in response to the reception of the request message including location information of the other electronic device, receive an address of an activated IMS processing function of a mobile edge computing (MEC) host (e.g., MEC host 341 of FIG. 3) from the IMS server in response to the transmission of the location information of the electronic device to the IMS server, and transmit IMS data to the other electronic device through the MEC host.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An IP multimedia subsystem (IMS) server comprising:
   a processor; and
   a memory operatively connected to the processor,
   wherein the memory stores instructions that, when executed, cause the processor to:
      determine whether a mobile edge computing (MEC) coverage in which a first user equipment is located and an MEC coverage in which a second user equipment is located are the same based on location information received from the first user equipment and the second user equipment,
      determine that IMS data to be transmitted and received between the first user equipment and the second user equipment is processed by an MEC host taking charge of the same MEC coverage based on the determining that the MEC coverage in which the first user equipment is located and the MEC coverage in which the second user equipment is located are the same, establish a session for IMS communication between the first user equipment and the second user equipment, instruct the MEC host to activate an IMS processing function, transmit an address of the activated IMS processing function of the MEC host to the first user equipment and the second user equipment, when the first user equipment deviates from the same MEC coverage:
  receive a message indicating deviation from the same MEC coverage supported by the MEC host from the first user equipment, based on a user input received by the first user equipment, when the second user equipment deviates from the same MEC coverage:
  receive a message indicating deviation from the same MEC coverage supported by the MEC host from the second user equipment, based on a user input received by the second user equipment, and
  deploy the IMS processing function from the MEC host to the IMS server based on the reception of the message.

2. The IMS server of claim 1, wherein the instructions further cause the processor to:
receive, from the first user equipment, a request message for transmitting and receiving the IP multimedia subsystem (IMS) data with the second user equipment together with the location information of the first user equipment, and
receive the location information of the second user equipment from the second user equipment in response to the request message.

3. The IMS server of claim 1, wherein the instructions further cause the processor to receive the location information through a session initiation protocol (SIP) message defined in 3GPP standards.

4. The IMS server of claim 1, wherein the location information comprises at least one of a cell ID related to a cellular network base station, to which corresponding user equipment is connected through a radio communication channel, GPS information, or MEC availability information acquired by the corresponding user equipment through performing of an MEC discovery procedure to search for the MEC host adjacent to the base station.

5. The IMS server of claim 4, wherein the MEC availability information comprises a URL and/or an IP address of the MEC host.

6. The IMS server of claim 1, wherein the IMS data comprises audio data or video data.

7. The IMS server of claim 1, wherein an operation for the deployment comprises:
commanding the MEC host to inactivate the IMS processing function; and
transmitting an address of the IMS processing function of the IMS server to the first user equipment or the second user equipment.

8. The IMS server of claim 1, wherein the instructions further cause the processor to transmit the address of the activated IMS processing function of the MEC host to the first user equipment and the second user equipment through a session description protocol (SDP) message defined in 3GPP standards.

9. An electronic device comprising:
a processor; and
a memory operatively connected to the processor, wherein the memory stores instructions that, when executed, cause the processor to:

transmit a request message for transmitting and receiving IP multimedia subsystem (IMS) media data with another electronic device to an IMS server together with location information of the electronic device, the IMS server being configured to establish a session for IMS communication between the electronic device and the other electronic device, receive an address of an activated IMS processing function of a mobile edge computing (MEC) host taking charge of an MEC coverage from the IMS server in response to the transmission of the location information, the MEC host being configured to process IMS data to be transmitted and received between the electronic device and the other electronic device, transmit IMS data to the other electronic device through the received address of the activated IMS processing function of the MEC host, detect mobility to deviate from the MEC coverage supported by the MEC host during transmission and reception of IMS data with the other electronic device through the MEC host, ask a user whether to continue an IMS service in response to the detection of the mobility, receive an address of an IMS processing function of the IMS server from the IMS server based on reception of a user input indicating the continuation of the IMS service, and transmit the IMS data to the other electronic device through the IMS server.

10. The electronic device of claim 9, wherein the instructions further cause the processor to transmit the location information to the IMS server through a session initiation protocol (SIP) message defined in 3GPP standards.

11. The electronic device of claim 9, wherein the location information comprises at least one of a cell ID related to a cellular network base station, to which the electronic device is connected through a radio communication channel, GPS information, or MEC availability information acquired by the electronic device through performing of an MEC discovery procedure to search for the MEC host adjacent to the base station.

12. The electronic device of claim 11, wherein the MEC availability information comprises a URL and/or an IP address of the MEC host.

13. The electronic device of claim 9, wherein the IMS data comprises audio data or video data.

14. The electronic device of claim 9, wherein the instructions further cause the processor to display information indicating that transmission and reception of IMS data are performed through the MEC host.

15. The electronic device of claim 9,
wherein the instructions further cause the processor to negotiate a media parameter with the other electronic device by transmitting and receiving a session initiation protocol (SIP) message defined in 3GPP standards in response to the reception of the user input indicating the continuation of the IMS service, and
wherein the media parameter includes the address of the IMS processing function of the IMS server.

16. The electronic device of claim 15, wherein the media parameter further includes codec information to process the IMS data to be transmitted and received with the other electronic device.

17. The electronic device of claim 9, wherein the instructions further cause the processor to receive the address of the activated IMS processing function of the MEC host from the IMS server through a session description protocol (SDP) message defined in 3GPP standards.

18. An electronic device comprising:
a processor; and
a memory operatively connected to the processor,
wherein the memory stores instructions that, when executed, cause the processor to:
receive a request message for transmitting and receiving IP multimedia subsystem (IMS) media data with another electronic device from an IMS server together with location information of the electronic device, the IMS server being configured to establish a session for IMS communication between the electronic device and the other electronic device,
transmit a response message including the location information of the electronic device to the IMS server in response to the reception of the request message including location information of the other electronic device,
receive an address of an activated IMS processing function of a mobile edge computing (MEC) host taking charge of an MEC coverage from the IMS server in response to the transmission of the location information of the electronic device to the IMS server, the MEC host being configured to process IMS data to be transmitted and received between the electronic device and the other electronic device,
transmit IMS data to the other electronic device through the received address of the activated IMS processing function of the MEC host,
detect mobility to deviate from the MEC coverage supported by the MEC host during transmission and reception of IMS data with the other electronic device through the MEC host,
ask a user whether to continue an IMS service in response to the detection of the mobility,
receive an address of an IMS processing function of the IMS server from the IMS server based on reception of a user input indicating the continuation of the IMS service, and
transmit the IMS data to the other electronic device through the IMS server.

* * * * *